(12) United States Patent
Nakano et al.

(10) Patent No.: US 10,473,016 B2
(45) Date of Patent: Nov. 12, 2019

(54) EXHAUST PURIFICATION DEVICE OF ENGINE

(71) Applicant: Mazda Motor Corporation, Aki-gun, Hiroshima (JP)

(72) Inventors: Yohei Nakano, Hiroshima (JP); Yasunori Uesugi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/108,667

(22) Filed: Aug. 22, 2018

(65) Prior Publication Data

US 2019/0093536 A1    Mar. 28, 2019

(30) Foreign Application Priority Data

Sep. 22, 2017  (JP) ................................. 2017-182511

(51) Int. Cl.
*F01N 3/20* (2006.01)
*F01N 3/10* (2006.01)
*F01N 3/021* (2006.01)

(52) U.S. Cl.
CPC ............ *F01N 3/208* (2013.01); *F01N 3/021* (2013.01); *F01N 3/103* (2013.01); *F01N 3/106* (2013.01); *F01N 3/2066* (2013.01); *F01N 2560/026* (2013.01); *F01N 2560/06* (2013.01); *F01N 2570/14* (2013.01); *F01N 2610/02* (2013.01); *F01N 2610/10* (2013.01); *F01N 2610/144* (2013.01); *F01N 2610/1406* (2013.01); *F01N 2610/146* (2013.01);

(Continued)

(58) Field of Classification Search
CPC .. F01N 2570/14; F01N 3/208; F01N 2610/02; F01N 2610/10; F01N 2610/1406
USPC ............................................. 422/168; 60/274
See application file for complete search history.

(56) References Cited

U.S. PATENT DOCUMENTS

2010/0132338 A1*  6/2010  Schmale ................. F01N 3/043
                                                                      60/287
2010/0257844 A1* 10/2010  Shimomura ............ F01N 3/208
                                                                      60/277

(Continued)

FOREIGN PATENT DOCUMENTS

EP         2682579 A2     1/2014
JP      2005240811 A     9/2005
JP        20149661 A     1/2014

*Primary Examiner* — Tom P Duong
(74) *Attorney, Agent, or Firm* — Alleman Hall Creasman & Tuttle LLP

(57) ABSTRACT

An exhaust purification device of an engine includes: an exhaust passage; a urea injector supplying urea water into the exhaust passage; a pump device which supplies urea water stored in a urea tank to the urea injector, the pump device capable of performing an operation of recovering the urea water supplied to the urea injector to the urea tank; an SCR catalyst which purifies the exhaust gas using urea; and a controller. The controller controls the pump device such that the supply of the urea water to the urea injector is stopped, and a recovery operation for recovering the urea water in the urea injector to the urea tank is performed in a case where an amount of ammonium adsorbed by the SCR catalyst is larger than a predetermined reference adsorption amount under a condition where an internal temperature of the urea injector reaches a predetermined high temperature.

8 Claims, 9 Drawing Sheets

(52) U.S. Cl.
    CPC ............... *F01N 2610/1433* (2013.01); *F01N 2610/1453* (2013.01); *F01N 2900/1602* (2013.01); *F01N 2900/1811* (2013.01); *F01N 2900/1821* (2013.01)

(56) References Cited

U.S. PATENT DOCUMENTS

| | | | | |
|---|---|---|---|---|
| 2014/0311428 A1* | 10/2014 | Miyagawa | .............. | F02B 43/10 123/3 |
| 2015/0104363 A1* | 4/2015 | Singh | ...................... | F01N 3/208 423/212 |
| 2016/0258334 A1* | 9/2016 | Aoki | ..................... | F01N 3/2066 |

\* cited by examiner

EXHAUST PURIFICATION DEVICE OF ENGINE

TECHNICAL FIELD

The present invention relates to an exhaust purification device of an engine which includes: a urea injector which supplies urea water into an exhaust passage; and a NOx selective reducing catalyst for purifying NOx by a reduction action of ammonium produced from supplied urea (hereinafter referred to as SCR catalyst).

BACKGROUND ART

In the exhaust purification device of an engine which uses the SCR catalyst, urea water is supplied into an exhaust passage from the urea injector disposed upstream of the SCR catalyst in the exhaust passage. When the urea injector becomes a high temperature by being exposed to an exhaust gas of high temperature which flows through the exhaust passage, urea water in the urea injector boils. This boiling is a kind of small explosion generated inside the urea injector, and there may be a case where a valve or a metal part disposed inside the urea injector is damaged by such an explosion. Further, there may be also a case where moisture in urea water is dissipated by such boiling so that urea precipitates thus lowering sliding property of the valve.

As a countermeasure to prevent occurrence of such a damage, there has been known a technique in which, in a situation where a urea injector reaches a high temperature, an amount of urea water injected from the urea injector is increased so as to cool the urea injector by urea water itself. However, when an amount of urea water is increased, there may be a case where urea containing ammonium whose amount exceeds an amount of ammonium adsorbable by an SCR catalyst is supplied to an exhaust passage so that an excessively large amount of ammonium passes through the SCR catalyst. In this case, ammonium reacts with a slip catalyst disposed downstream of the SCR catalyst in the exhaust passage so that ammonium is reduced to NOx thus giving rise to a drawback that a discharge amount of NOx is increased. To overcome this drawback, JP2014-009661A discloses a technique in which, when a condition where a urea injector becomes a high temperature is satisfied, urea water is recovered into a urea tank from the urea injector.

However, when urea water is temporarily recovered into the urea tank from the urea injector, there is a concern that a state is brought about where no urea water exists in the urea injector and a urea water supply pipe. In this case, there is a concern that the supply of urea into the exhaust passage from the urea injector which takes place thereafter is delayed. When the supply of urea is not performed in a timely manner, a NOx purifying performance is lowered.

SUMMARY OF INVENTION

It is an object of the present invention to provide an exhaust purification device of an engine which can suppress occurrence of a damage on a urea injector without lowering a NOx purifying performance.

An exhaust purification device of an engine according to an aspect of the present invention includes: an exhaust passage through which an exhaust gas discharged from an engine body flows; a urea injector which supplies urea water into the exhaust passage; a pump device which supplies urea water stored in a urea tank to the urea injector, the pump device also capable of performing an operation of recovering the urea water supplied to the urea injector to the urea tank; an SCR catalyst which is disposed in the exhaust passage downstream of the urea injector and purifies NOx in the exhaust gas by a reduction action of ammonium produced from the urea; and a controller which controls an operation of the urea injector and an operation of the pump device, wherein the controller is configured to control the pump device such that the supply of the urea water to the urea injector is stopped, and a recovery operation for recovering the urea water in the urea injector to the urea tank is performed in a case where an amount of ammonium adsorbed by the SCR catalyst is larger than a predetermined reference adsorption amount under a condition where an internal temperature of the urea injector reaches a predetermined high temperature.

An exhaust purification method according to another aspect of the present invention is an exhaust purification method using an exhaust purification device of an engine which includes: the exhaust passage; the urea injector; the pump device; and the SCR catalyst, wherein the method includes the steps of: determining whether or not an amount of ammonium adsorbed by the SCR catalyst is larger than a predetermined reference adsorption amount under a condition where an internal temperature of the urea injector reaches a predetermined high temperature; and causing the pump device to stop the supply of the urea water to the urea injector and perform a recovery operation for recovering the urea water in the urea injector to the urea tank in a case where the amount of ammonium is larger than the reference adsorption amount.

DESCRIPTION OF EMBODIMENTS

[Overall Configuration of Engine]

Hereinafter, a preferred embodiment of the present invention is described in detail with reference to drawings. First, overall configuration of an engine to which an exhaust purification device according to the present invention is applied is described with reference to FIG. 1. The engine shown in FIG. 1 is a 4-cycle diesel on-vehicle engine mounted on a vehicle as a power source for traveling, and includes: an engine body 1; an intake system 3S for supplying air necessary for combustion in the engine body 1; an exhaust system 4S (exhaust purification device) for discharging an exhaust gas discharged from the engine body 1 to the outside after purifying the exhaust gas; a supercharging device 50 which feeds air (intake air) supplied by the intake system 3S into the engine body 1 while compressing the air; and an EGR device 70 which returns a portion of an exhaust gas flowing through the exhaust system 4S into the intake system 3S.

Figure 1:
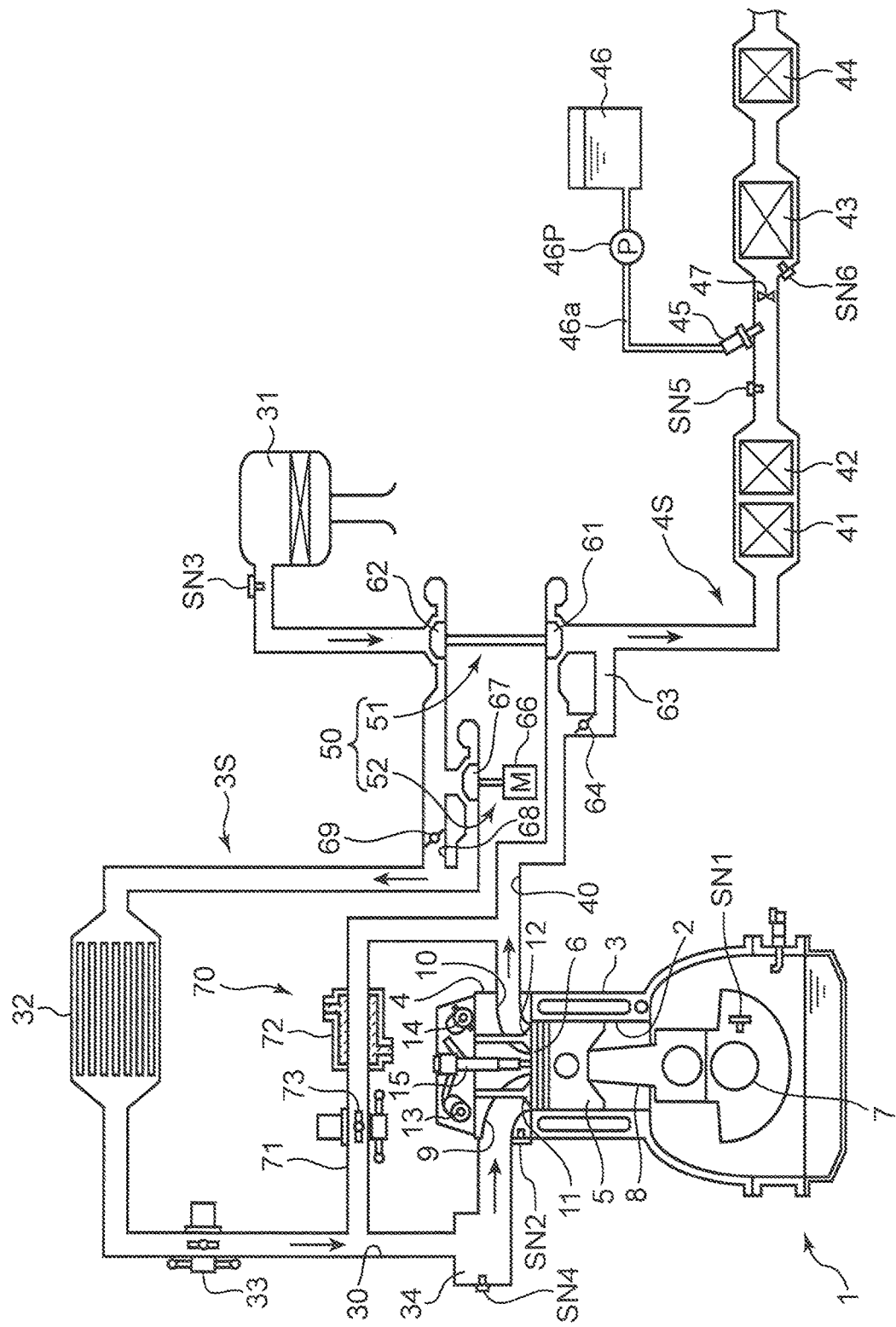
FIG. 1 is a system diagram showing an embodiment of an engine to which an exhaust purification device of the present invention is applied.

The engine body 1 is an in-line multi-cylinder type engine body including a plurality of cylinders 2 arranged in a row (only one cylinder 2 is shown in FIG. 1), and the engine body 1 includes: a cylinder block 3 in which the plurality of cylinders 2 are formed; a cylinder head 4 which is mounted on an upper surface of the cylinder block 3 so as to close upper openings of the respective cylinders 2; and a plurality of pistons 5 which are inserted into the respective cylinders 2 in a reciprocating manner. The respective cylinders 2 have the same configuration and hence, basically, the description is made hereinafter by focusing on only one cylinder 2.

A combustion chamber 6 is defined above the piston 5. Fuel containing light oil as a main component is supplied to the combustion chamber 6 by injection of fuel from a fuel injection valve 15 described later. The supplied fuel is burnt (diffused combustion) by compression ignition, and the piston 5 pushed down by an expansion force generated by the combustion is moved in a reciprocating manner in a vertical direction.

A crankshaft 7 which is an output shaft of the engine body 1 is disposed below the piston 5. The crankshaft 7 is connected to the piston 5 by way of a connecting rod 8, and the crankshaft 7 is rotatably driven about a center axis in response to a reciprocating movement (vertical movement) of the piston 5.

A crank angle sensor SN1 is mounted on the cylinder block 3 for detecting an angle of the crankshaft 7 (crank angle) and a rotational speed of the crankshaft 7 (engine rotational speed). A water temperature sensor SN2 is mounted on the cylinder head 4 for detecting a temperature of cooling water which flows through the inside of the engine body 1 (the cylinder block 3 and the cylinder head 4).

On the cylinder head 4, an intake port 9 and an exhaust port 10, an intake valve 11, an exhaust valve 12, and valve operating mechanisms 13, 14 are mounted. The intake port 9 and the exhaust port 10 open in the combustion chamber 6. The intake valve 11 opens and closes the intake port 9. The exhaust valve 12 opens and closes the exhaust port 10. The valve operating mechanisms 13, 14 drive the intake valve 11 and the exhaust valve 12 in an openable and closable manner interlocking with the rotation of the crankshaft 7.

The fuel injection valve 15 for injecting fuel (light oil) into the combustion chamber 6 is also mounted on the cylinder head 4. The fuel injection valve 15 is, for example, a multiple-injection-aperture type injection valve which injects fuel radially from a center portion of a ceiling surface of the combustion chamber 6. Although not illustrated, a recessed portion (cavity) for receiving fuel injected from the fuel injection valve 15 is formed on a crowned surface of the piston 5.

The intake system 3S includes an intake passage 30 through which intake air introduced into the engine body 1 flows. A downstream end (intake manifold) of the intake passage 30 is connected to one side surface of the cylinder head 4 so as to be communicated with the intake port 9. On the intake passage 30, an air cleaner 31 which removes foreign substances in intake air, an inter cooler 32 which cools intake air compressed by the supercharging device 50, a throttle valve 33 which is openable and closable for adjusting a flow rate of intake air, and a surge tank 34 which makes intake air uniformly taken into the respective cylinders 2 are mounted in this order from an upstream side of the intake passage 30 (a side remote from the engine body 1).

On a portion of the intake passage 30 downstream of the air cleaner 31, an air flow sensor SN3 which detects a flow rate of air (fresh air) introduced into the engine body 1 through the intake passage 30 is mounted. An intake pressure sensor SN4 which detects a pressure of intake air in the surge tank 34 is mounted on the surge tank 34.

The exhaust system 4S includes an exhaust passage 40 through which an exhaust gas discharged from the engine body 1 flows. An upstream end (exhaust manifold) of the exhaust passage 40 is connected to the other side surface of the cylinder head 4 so as to be communicated with the exhaust port 10. A plurality of catalysts 41 to 44 are disposed in the exhaust passage 40 for purifying various harmful components contained in the exhaust gas. In this embodiment, an oxidation catalyst 41, a diesel particulate filter (DPF) 42, an SCR catalyst 43, and a slip catalyst 44 are disposed in the exhaust passage 40 in this order from an upstream side of the exhaust passage 40 (a side close to the engine body 1). A urea injector 45 and a mixing plate 47 are mounted on a portion of the exhaust passage 40 between the DPF 42 and the SCR catalyst 43.

The oxidation catalyst 41 is a catalyst for forming CO and HC in an exhaust gas into non-harmful substances by oxidation (converting CO and HC into $CO_2$ and $H_2O$). The oxidation catalyst 41 includes, for example, a porous carrier and a catalytic substance such as platinum or palladium carried on the carrier. The DPF 42 is a filter for collecting soot in an exhaust gas. A catalytic substance such as platinum is contained in the DPF 42 for burning the soot under a high temperature condition at the time of regenerating the filter.

The urea injector 45 is an injection valve for supplying, to the exhaust passage 40, urea water obtained by dissolving urea of high purity into pure water. A downstream end of a supply pipe 46a for supplying urea water is connected to the urea injector 45. A urea tank 46 for storing urea water is connected to an upstream end of the supply pipe 46a. Further, a pump 46P (pump device/pressurizing pump) for supplying urea water to the urea injector 45 is assembled into the supply pipe 46a. When urea water is injected from the urea injector 45 into the exhaust passage 40, urea contained in the urea water is converted into ammonium ($NH_3$) by hydrolysis under a high temperature, and ammonium is adsorbed by the SCR catalyst 43 disposed downstream of the urea injector 45.

The pump 46P is a pressurizing pump, and supplies urea water stored in the urea tank 46 to the urea injector 45 through the supply pipe 46a by generating pressurizing force. When the generation of the pressurizing force is stopped, urea water existing in the urea injector 45 and in the supply pipe 46a is returned to the urea tank 46. That is, the pump 46P is a pump device capable of performing an operation of supplying urea water to the urea injector 45 and an operation of recovering urea water, which is once supplied to the urea injector 45, into the urea tank 46.

The mixing plate 47 is a plate-like member which partitions the exhaust passage 40 in a longitudinal direction, and is disposed in a portion of the exhaust passage 40 between the urea injector 45 and the SCR catalyst 43. A plurality of apertures are formed in the mixing plate 47 for stirring the flow of an exhaust gas. Such a mixing plate 47 has a function of feeding urea contained in urea water injected from the urea injector 45 toward a downstream side (SCR catalyst 43) while uniformly dispersing urea.

The SCR catalyst 43 is a catalyst which is disposed in the exhaust passage 40 downstream of the urea injector 45 and purifies an exhaust gas by reducing NOx in the exhaust gas (converting NOx into $N_2$ and $H_2O$). The SCR catalyst 43 includes, for example, a porous carrier and a catalytic substance such as vanadium, tungsten, or zeolite carried on the carrier. As described previously, ammonium produced from urea water, which is injected from the urea injector 45, is adsorbed by the SCR catalyst 43. The SCR catalyst 43 converts NOx in the exhaust gas into $N_2$ and $H_2O$ due to a chemical reaction in which the ammonium is used as a reducing agent (a reducing action of ammonium).

The slip catalyst 44 is an oxidation catalyst for oxidizing slipped ammonium which is not adsorbed by the SCR catalyst 43 (that is, flown out toward a downstream side without being used for reduction of NOx). As such a slip catalyst 44, for example, a catalyst having substantially the same structure as the oxidation catalyst 41 can be used.

At a portion of the exhaust passage 40 between the DPF 42 and the SCR catalyst 43, a NOx concentration sensor SN5 which detects a concentration of NOx contained in an exhaust gas is disposed. Further, at a portion of the exhaust passage 40 positioned downstream of the NOx concentration sensor SN5 and immediately upstream of the SCR catalyst 43 (at a portion between the mixing plate 47 and the SCR catalyst 43), an exhaust temperature sensor SN6 which detects a temperature of an exhaust gas is disposed.

The supercharging device 50 is a so-called two-stage type supercharging device, and includes a first supercharger 51 and a second supercharger 52 arranged in series. The first supercharger 51 is a so-called turbosupercharger, and includes a turbine 61 which is rotatably driven by an exhaust gas which flows through the exhaust passage 40, and a first compressor 62 which is disposed rotatably in an interlocking manner with the turbine 61 and compresses intake air which flows through the intake passage 30. The first compressor 62 is disposed in a portion of the intake passage 30 between the air cleaner 31 and the inter cooler 32. The turbine 61 is disposed in a portion of the exhaust passage 40 upstream of the oxidation catalyst 41. A bypass passage 63 for bypassing the turbine 61 is provided to the exhaust passage 40, and an openable and closable waste gate valve 64 is disposed in the bypass passage 63.

The second supercharger 52 is a so-called electrically-operated supercharger, and includes an electrically-operated drive motor 66, and a second compressor 67 which compresses intake air by being rotatably driven by the drive motor 66. The second compressor 67 is disposed in a portion of the intake passage 30 downstream of the first compressor 62 (between the first compressor 62 and the inter cooler 32). A bypass passage 68 for bypassing the second compressor 67 is provided to the intake passage 30. An openable and closable bypass valve 69 is disposed in the bypass passage 68.

The EGR device 70 includes: an EGR passage 71 which connects the exhaust passage 40 and the intake passage 30 to each other; and an EGR cooler 72 and an EGR valve 73 mounted on the EGR passage 71. The EGR passage 71 connects a portion of the exhaust passage 40 upstream of the turbine 61 and a portion of the intake passage 30 between the throttle valve 33 and the surge tank 34 to each other. The EGR cooler 72 is, for example, a heat exchanger which utilizes cooling water for the engine, and cools an exhaust gas (EGR gas) returned from the exhaust passage 40 to the intake passage 30 through the EGR passage 71. The EGR valve 73 is disposed in a portion of the EGR passage 71 downstream of the EGR cooler 72 (on a side close to the intake passage 30), and regulates a flow rate of an exhaust gas which flows through the EGR passage 71.

[Control System]

Figure 2:
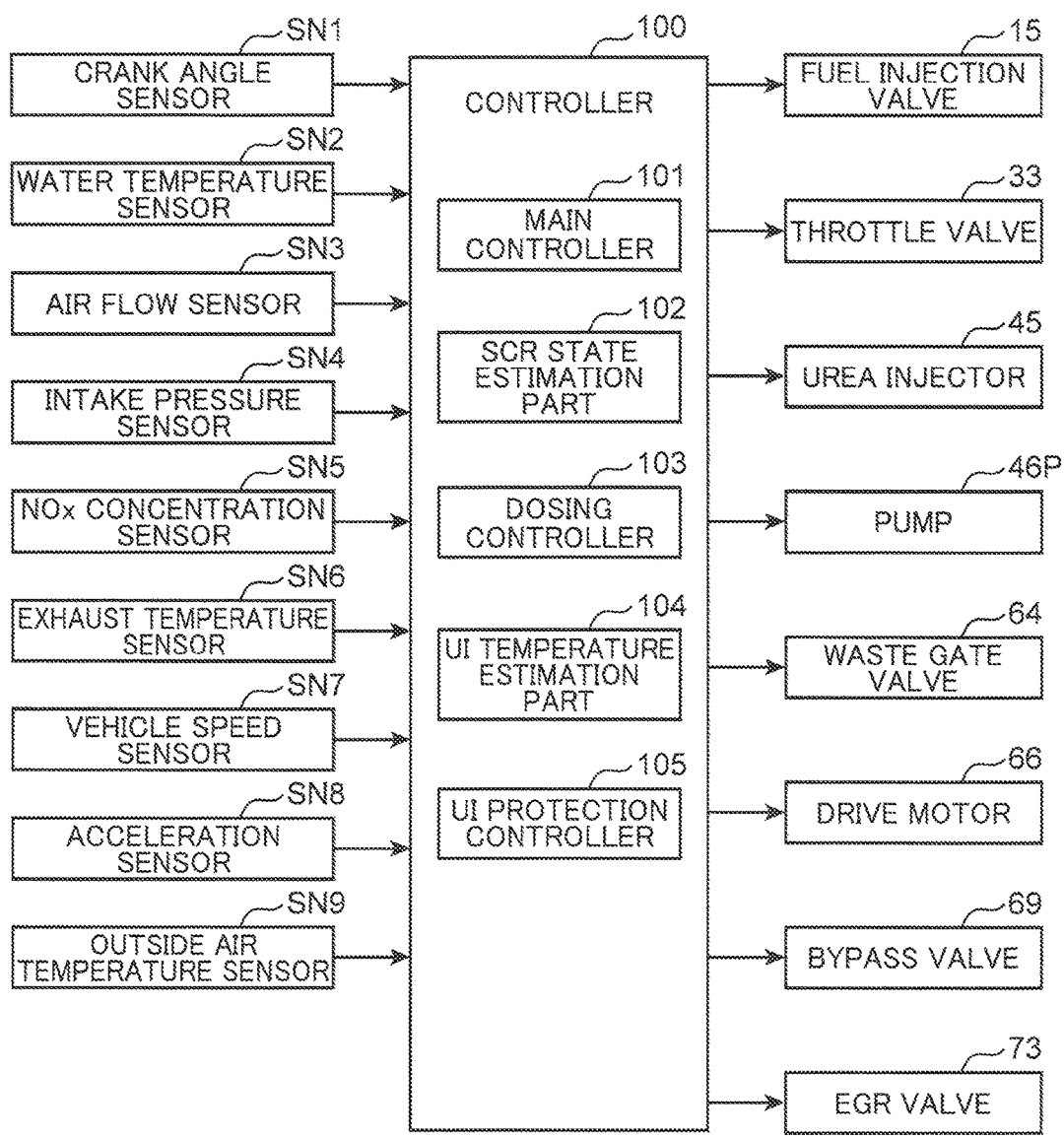
FIG. 2 is a block diagram showing a control system of the engine.

FIG. 2 is a block diagram showing a control system of the engine according to this embodiment. A vehicle on which the engine according to this embodiment is mounted includes a controller 100 which controls the engine in a comprehensive manner. The controller 100 is a microprocessor, and is formed of well-known CPU, ROM, RAM and the like. In this embodiment, the controller 100 functions as a claimed controller for controlling an operation of the urea injector 45 and an operation of the pump 46P. It is not always necessary that the controller 100 be formed of a single processor, and may include a plurality of processors electrically connected to each other. For example, the controller 100 may include a first processor for mainly controlling the engine body 1, and a second processor for performing a dosing control of the urea injector 45, the pump 46P and the like.

Detection information obtained by various sensors is inputted to the controller 100. Specifically, the controller 100 is electrically connected to the crank angle sensor SN1, water temperature sensor SN2, air flow sensor SN3, intake pressure sensor SN4, NOx concentration sensor SN5, and the exhaust temperature sensor SN6. Various information detected by these sensors, for example, a crank angle, an engine rotational speed, an engine water temperature, an intake flow rate, an intake pressure (supercharge pressure), NOx concentration in an exhaust gas, a temperature of an exhaust gas and the like are inputted to the controller 100 respectively.

In addition to the above-mentioned sensors, the vehicle also includes: a vehicle speed sensor SN7 which detects a traveling speed of the vehicle (hereinafter referred to as vehicle speed); an acceleration sensor SN8 which detects a degree of opening of an acceleration pedal manipulated by a driver who drives the vehicle; and an outside air temperature sensor SN9 which detects an outside air temperature. Detection information detected by the vehicle speed sensor SN7, the acceleration sensor SN8 and the outside air temperature sensor SN9 are also inputted to the controller 100.

The controller 100 controls the respective parts of the engine while performing various determinations, arithmetic operations and the like based on input information from the respective sensors SN1 to SN9. That is, the controller 100 is electrically connected to the fuel injection valve 15, the throttle valve 33, the urea injector 45, the pump 46P, the waste gate valve 64, the drive motor 66, the bypass valve 69, the EGR valve 73 and the like. The controller 100 outputs control signals to these devices based on results of the arithmetic operations and the like.

The controller 100 includes: a main controller 101; an SCR state estimation part 102; a dosing controller 103; a urea injector (UI) temperature estimation part 104; and a UI protection controller 105 as functional elements relating to the above-mentioned control. The UI temperature estimation part 104 and the UI protection controller 105 (controller) are functional parts for performing a control of ensuring NOx purification performance while preventing breaking of the urea injector 45 due to boiling of the urea water described above.

The main controller 101 is a control module which performs a combustion control in the engine body 1. For example, the main controller 101 determines an injection amount and an injection timing of fuel injected from the fuel injection valve 15 based on: an engine rotational speed detected by the crank angle sensor SN1; an engine load (required torque) specified based on a detection value (degree of opening of acceleration) of the acceleration sensor SN8; and an intake flow rate detected by the air flow sensor SN3, and controls the fuel injection valve 15 in accordance with the determination.

The main controller 101 sets a target supercharge pressure based on the above-mentioned engine rotational speed, load and the like and, at the same time, controls respective degrees of openings of the waste gate valve 64 and the bypass valve 69 and the rotation of the drive motor 66 such that an intake pressure (supercharge pressure) detected by the intake pressure sensor SN4 coincides with the target supercharge pressure. Further, the main controller 101 sets a target EGR rate which is a target value of an EGR rate (a rate of an EGR gas with respect to a total gas introduced into the cylinder 2) based on the engine rotational speed, load and the like, and controls the respective degrees of openings of the throttle valve 33 and the EGR valve 73 such that the target EGR rate is realized.

The SCR state estimation part 102 is a control module which controls a process of estimating a state of the SCR catalyst 43. For example, the SCR state estimation part 102 estimates a temperature and an ammonium adsorption amount of the SCR catalyst 43 based on a NOx concentration in an exhaust gas detected by the NOx concentration sensor SN5, a temperature of an exhaust gas detected by the exhaust temperature sensor SN6, and an injection amount of urea water from the urea injector 45.

The dosing controller 103 is a control module which controls injection of urea water by the urea injector 45. For example, the dosing controller 103 determines an injection amount of urea water based on a temperature of the SCR catalyst 43 estimated by the SCR state estimation part 102, and controls the urea injector 45 in accordance with the determination.

The UI temperature estimation part 104 derives an estimation value of an internal temperature in the urea injector 45 based on information inputted from various sensors. Specifically, the UI temperature estimation part 104 derives an estimation value of an internal temperature in the urea injector 45 based on a flow rate of an exhaust gas, a temperature of an exhaust gas, a vehicle speed, an injection amount of urea water from the urea injector 45 and the like in the current situation.

A flow rate and a temperature of an exhaust gas are data referenced as elements for heating the urea injector 45. A flow rate of an exhaust gas can be estimated based on an intake flow rate detected by the air flow sensor SN3, a degree of opening of the EGR valve 73 or the like, for example. As a temperature of an exhaust gas, a detection value of the exhaust temperature sensor SN6 disposed at a position close to the urea injector 45 can be used. A vehicle speed and an injection amount of urea water are data referenced as elements for cooling the urea injector 45. That is, the higher a vehicle speed is, the larger an amount of traveling air impinging on the urea injector 45 becomes so that the radiation of heat from the urea injector 45 is accelerated, and the larger an injection amount of urea water is, the larger an effect of cooling the urea injector 45 by urea water itself becomes. A detection value of the vehicle speed sensor SN7 can be used as a vehicle speed. A state where a vehicle speed is a predetermined speed or below can be used as a condition for determining that an internal temperature of the urea injector 45 reaches a predetermined high temperature. As an injection amount of urea water, an injection amount determined by the dosing controller 103 can be referenced.

When an internal temperature of the urea injector 45 derived by the UI temperature estimation part 104 is a high temperature which exceeds a preset temperature, the UI protection controller 105 performs a control of protecting the urea injector 45 for preventing occurrence of a defect caused by boiling of urea water without lowering NOx purification performance as much as possible.

In general, when it is detected that an exhaust purification operation is performed under an operation condition where an internal temperature of the urea injector 45 reaches a predetermined high temperature, first, the UI protection controller 105 attempts to perform self-cooling of the urea injector 45 by increasing an amount of urea water supplied to the urea injector 45. Then, in the case where the internal temperature of the urea injector 45 is not lowered below the predetermined high temperature even when the self-cooling is performed and an amount of ammonium adsorbed by the SCR catalyst 43 is larger than a predetermined reference adsorption amount, the UI protection controller 105 performs a urea water recovery control. In the urea water recovery control, the urea injector 45 and the pump 46P are controlled such that the supply of urea water from the urea tank 46 to the urea injector 45 is stopped and, at the same time, a recovery operation for recovering urea water in the urea injector 45 to the urea tank 46 is performed. Such a control for protecting the urea injector 45 is described in detail later.

[Dosing Control Performed as Base Control]

Next, a dosing control which is a control of an injection operation of urea water from the urea injector 45 is described with reference to FIG. 3 to FIG. 6. With respect to the dosing control, a basic dosing control performed by the dosing controller 103 during a normal operation of the engine or the like is described. In the dosing control during the normal operation of the engine, a control is performed such that a target adsorption amount of ammonium (Qa in FIG. 5) is set corresponding to a temperature of the SCR catalyst 43, and an amount of urea water corresponding to the target adsorption amount of ammonium is injected from the urea injector 45. The target adsorption amount is preset based on an amount of ammonium which the SCR catalyst 43 can adsorb.

Figure 3:
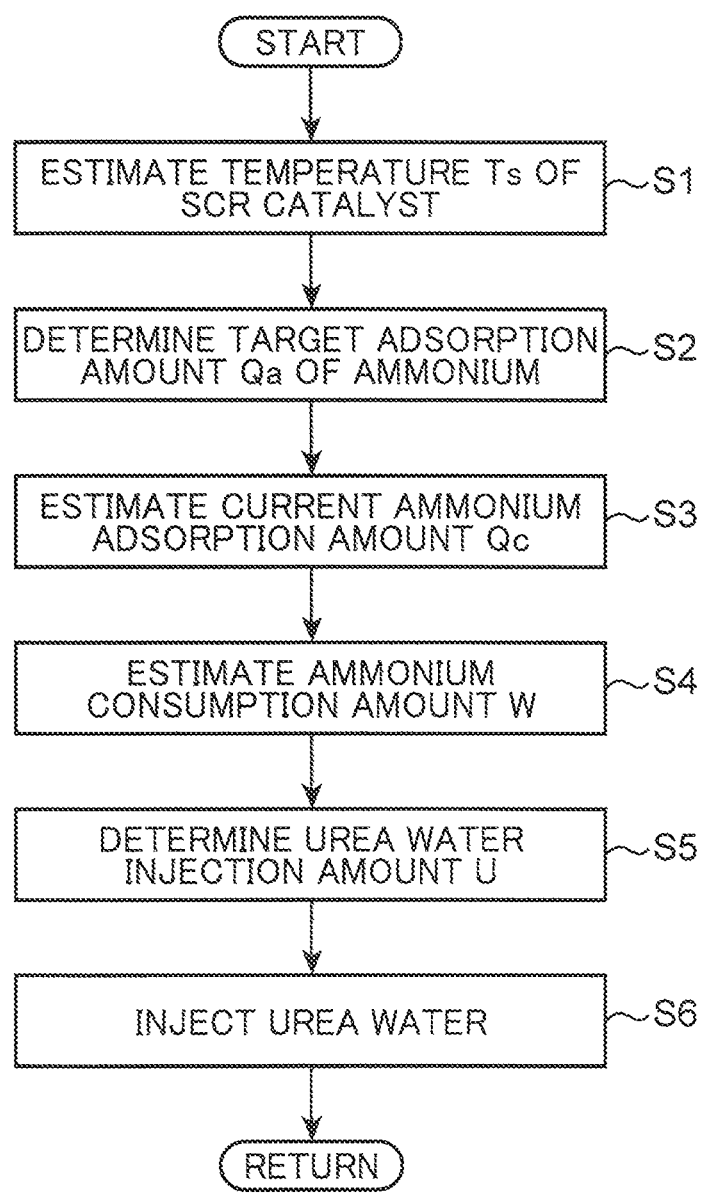
FIG. 3 is a flowchart showing specific steps of a dosing control performed during normal driving of the engine.

FIG. 3 is a flowchart showing specific steps of the dosing control during the normal operation of the engine. When the control starts, the controller 100 (dosing controller 103) estimates a temperature Ts of the SCR catalyst 43 (step S1). The temperature Ts of the SCR catalyst 43 is typically a temperature of a carrier of the SCR catalyst 43, that is, a floor temperature of the SCR catalyst 43.

Figure 4:
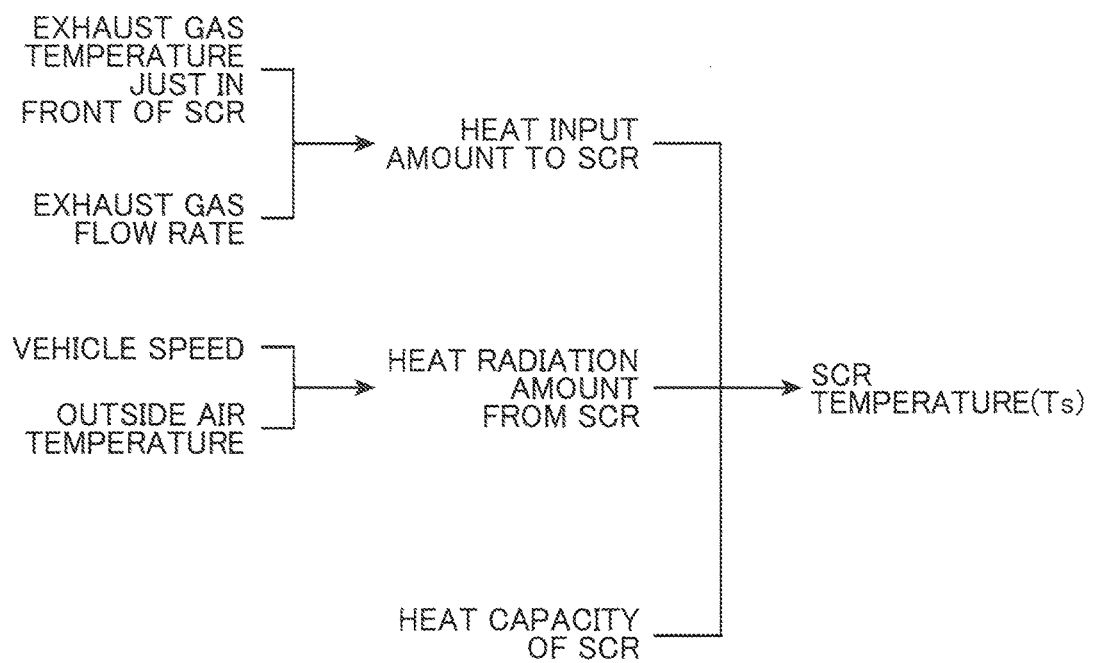
FIG. 4 is an explanatory view for schematically showing steps of estimating a temperature of an SCR catalyst.

FIG. 4 is a view schematically showing the steps of estimating a temperature Ts of the SCR catalyst 43 in step S1 (in the figure, the SCR catalyst is simply referred to as SCR for short). First, the controller 100 calculates a heat input amount to the SCR catalyst 43 based on a temperature of an exhaust gas just in front of the SCR catalyst 43 detected by the exhaust temperature sensor SN6 and a flow rate of the exhaust gas. As described previously, the flow rate of the exhaust gas can be estimated based on an intake flow rate detected by the air flow sensor SN3, a degree of opening of the EGR valve 73 or the like.

Next, the controller 100 calculates a heat radiation amount from the SCR catalyst 43 based on a vehicle speed detected by the vehicle speed sensor SN7 and an outside air temperature detected by the outside air temperature sensor SN9. The controller 100 calculates a temperature Ts of the SCR catalyst 43 based on a calculated heat input amount to the SCR catalyst 43 and a calculated heat radiation amount from the SCR catalyst 43, and a pre-stored heat capacity of the SCR catalyst 43. The temperature Ts of the SCR catalyst 43 is calculated such that the larger the heat input amount or the smaller the heat radiation amount is, the higher a value of the temperature Ts becomes, while the smaller the heat input amount or the larger the heat radiation amount is, the lower the value of the temperature Ts becomes. The heat radiation amount from the SCR catalyst is treated such that the higher a vehicle speed is, the larger the heat radiation amount from the SCR catalyst 43 becomes. This is because the higher the vehicle speed is, the larger an amount of traveling air which impinges on the SCR catalyst 43 becomes so that heat radiation is accelerated. On the other hand, it is estimated that the lower the vehicle speed is, the higher the temperature Ts of the SCR catalyst 43 becomes because the lower the vehicle speed is, the smaller the heat radiation amount becomes.

Figure 5:
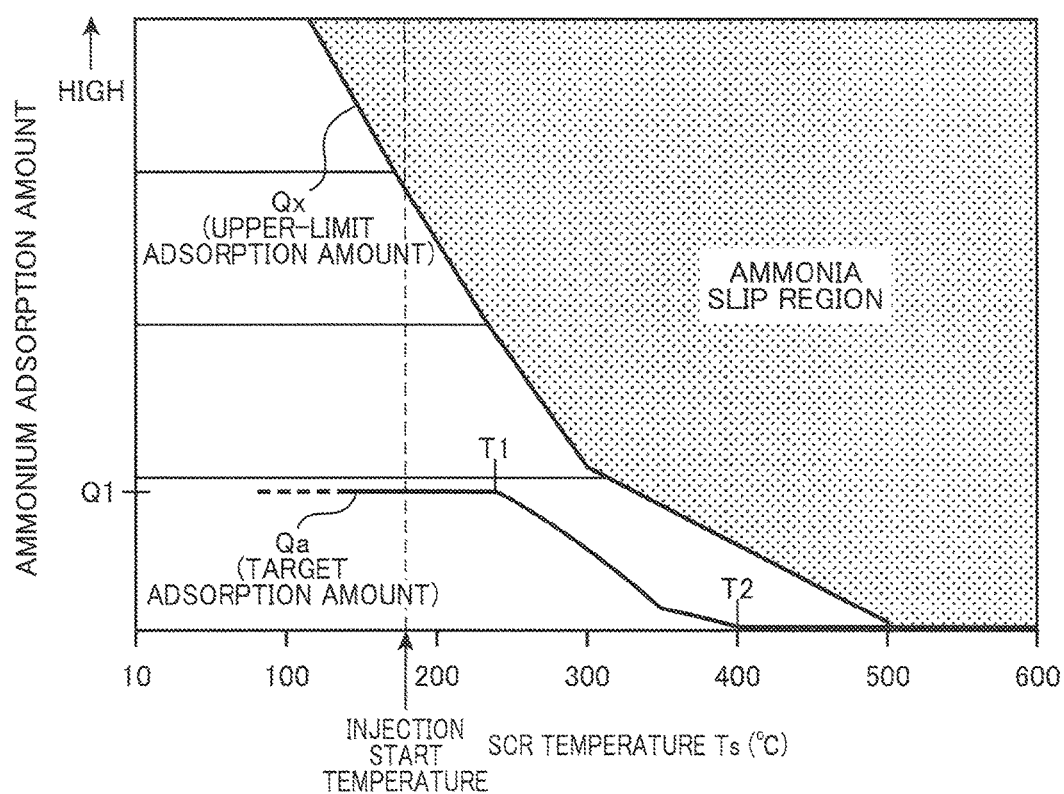
FIG. 5 is a graph showing a relationship between a temperature of the SCR catalyst and an upper-limit adsorption amount and a target adsorption amount of ammonium.

Next, the controller 100 determines a target adsorption amount Qa of ammonium to be adsorbed by the SCR catalyst 43 (step S2). FIG. 5 is a graph showing a relationship between a temperature of the SCR catalyst 43, an upper-limit adsorption amount Qx of ammonium, and a target adsorption amount Qa of ammonium. The target adsorption amount Qa is a proper ammonium adsorption amount with which desired NOx purification in the SCR catalyst 43 can be performed. As shown in the graph in FIG. 5, the target adsorption amount Qa is variably set in response to a temperature of the SCR catalyst 43 (SCR temperature) Ts within a region lower than the upper-limit adsorption amount Qx. The controller 100 preliminarily stores a map where a relationship between the temperature Ts of the SCR catalyst 43 and the target adsorption amount Qa is established, and determines the target adsorption amount Qa by collating the temperature Ts of the SCR catalyst 43 estimated in step S1 with the map.

The target adsorption amount Qa of ammonium is set to a value smaller than the upper-limit adsorption amount Qx. The upper-limit adsorption amount Qx is an upper limit ammonium adsorption amount which can be adsorbed by the SCR catalyst 43, and is also referred to as a saturated adsorption amount. The SCR catalyst 43 has a property that the higher an inner temperature of the SCR catalyst 43 is, the more difficult the adsorption of ammonium by the SCR catalyst 43 becomes. Accordingly, a line of the upper-limit adsorption amount Qx shown in FIG. 5 has a (right downward) tendency where an adsorption amount is decreased toward a high temperature side (right side) as a whole. A region beyond the upper-limit adsorption amount Qx is an ammonium slip region where ammonium is slipped from the SCR catalyst 43 and is flown out to a downstream side of the exhaust passage 40.

In conformity with the tendency of the upper-limit adsorption amount Qx as described above, the target adsorption amount Qa of ammonium is also set to a value which is variable in such a manner that the higher the temperature Ts of the SCR catalyst 43 is, the lower the target adsorption amount Qa of ammonium becomes (reversely, the lower the temperature Ts of the SCR catalyst 43 is, the higher the target adsorption amount Qa of ammonium becomes). The controller 100 controls an operation of the urea injector 45 and an operation of the pump 46P in response to such a variable target adsorption amount Qa. However, the target adsorption amount Qa changes depending on a temperature in this manner only within a range where the temperature Ts of the SCR catalyst 43 belongs within a predetermined high temperature region (Ts being within a range of from T1 to T2). The target adsorption amount Qa is set to a fixed value Q1 within a range on a low temperature side where the temperature Ts is equal to or below a temperature T1, and the target adsorption amount Qa is uniformly set to zero within a range on a high temperature side where the temperature Ts is equal to or above a temperature T2. The reason the target adsorption amount Qa is set to the fixed value Q1 on the low temperature side (Ts≤T1) is as follows. As long as an amount of ammonium approximately at a level of Q1 can be adsorbed by the SCR catalyst 43, the SCR catalyst 43 exhibits a sufficiently favorable NOx purification performance and hence, it is meaningless to further increase an adsorption amount beyond Q1.

Next, the controller 100 estimates a current ammonium adsorption amount Qc which is an amount of ammonium adsorbed by the SCR catalyst 43 at this point of time (step S3). Although described in detail in step S5 described later, the current ammonium adsorption amount Qc is a parameter used in a process of determining an injection amount of urea water from the urea injector 45. Accordingly, the current ammonium adsorption amount Qc can be obtained by calculating backward based on the history of the injection amount of urea water up to now. That is, an amount of ammonium obtained by subtracting an ammonium consumption amount at each point of time in the SCR catalyst 43 (calculated in next step S4) from an ammonium supply amount at such each point of time obtained based on a history of an injection amount of urea water is accumulated in the SCR catalyst 43 in such each point of time and hence, a current ammonium adsorption amount Qc can be calculated by integrating amounts of ammonium accumulated at respective points of time.

Next, the controller 100 estimates an ammonium consumption amount W which is an amount of ammonium consumed in the SCR catalyst 43 (step S4). The controller 100 calculates an amount of NOx which flows in the SCR catalyst 43 based on a NOx concentration in an exhaust gas detected by the NOx concentration sensor SN5 and a flow rate of the exhaust gas estimated by arithmetic operation (a value obtained based on a detection value of an intake flow rate, a degree of opening of the EGR valve 73 or the like). The controller 100 calculates an amount of ammonium consumed for NOx reduction in the SCR catalyst 43, that is, an ammonium consumption amount W based on the calculated inflow amount of NOx (see a portion of FIG. 6 described later).

Next, the controller 100 determines an injection amount U of urea water to be injected from the urea injector 45 (step S5), and controls an operation of the urea injector 45 and an operation of the pump 46P such that an amount of urea corresponding to the determined injection amount U is injected from the urea injector 45 (step S6).

Figure 6:
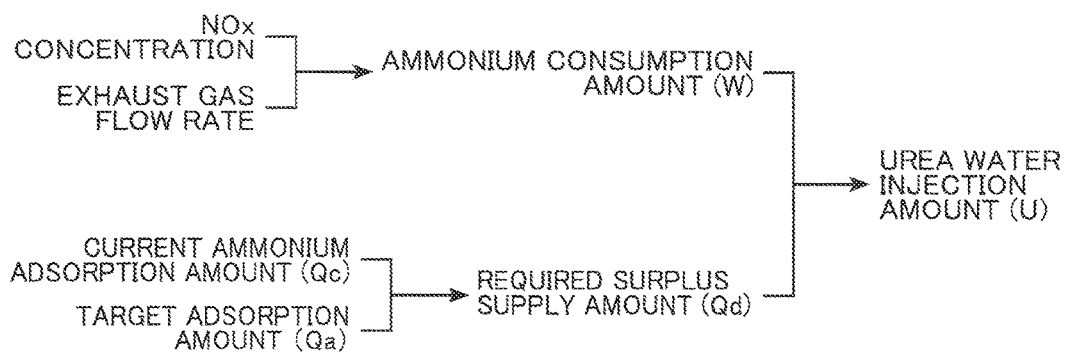
FIG. 6 is an explanatory view schematically showing steps of determining an injection amount of urea water.

FIG. 6 is a view schematically showing steps of determining an injection amount U in step S5. The controller 100 calculates an injection amount U of urea water based on an ammonium consumption amount W obtained in step S4 and a required surplus supply amount Qd of ammonium. The required surplus supply amount Qd of ammonium is a surplus supply amount of ammonium necessary for increasing an ammonium adsorption amount Qc to the target adsorption amount Qa in the SCR catalyst 43, and is a value obtained by subtracting the current ammonium adsorption amount Qc calculated in step S3 from the target adsorption amount Qa of ammonium determined in step S2. The injection amount U of urea water is calculated such that the larger the required surplus supply amount Qd or the larger the ammonium consumption amount W is, the higher the value of the injection amount U becomes.

[Control for Protecting Urea Injector]

The above-described operations are the basic operations of the dosing control. Subsequently, the description is made with respect to a dosing control which is performed under a condition where an internal temperature of the urea injector 45 reaches a high temperature which may generate boiling of urea water. That is, a urea injector protection control is described. As described previously, this protection control is intended to prevent lowering of NOx purification performance as much as possible while suppressing damaging of urea injector 45 caused by boiling of urea water. The protection control is mainly performed by the UI temperature estimation part 104 and the UI protection controller 105.

The protection control is mainly performed under an operation condition where a temperature of an exhaust gas passing through the exhaust passage 40 becomes considerably high compared to a usual state or under an operation condition where performance of the cooling element in the exhaust passage 40 is lowered. As an example of the former operation condition, for example, an operation condition is considered where a temperature of an exhaust gas is intentionally set high for regeneration process of the DPF 42. As an example of the latter operation condition, an operation condition is considered where a vehicle speed is low so that cooling performance obtained by traveling air is lowered. Whether or not such operation conditions are established, that is, whether or not a condition where an internal temperature of the urea injector 45 reaches a predetermined high temperature is established is determined by processing performed by the UI temperature estimation part 104. The protection control includes: an amount increase control in which an amount of urea water supplied to the urea injector 45 is increased; and a recovery control in which urea water is recovered from the urea injector 45.

Figure 7:
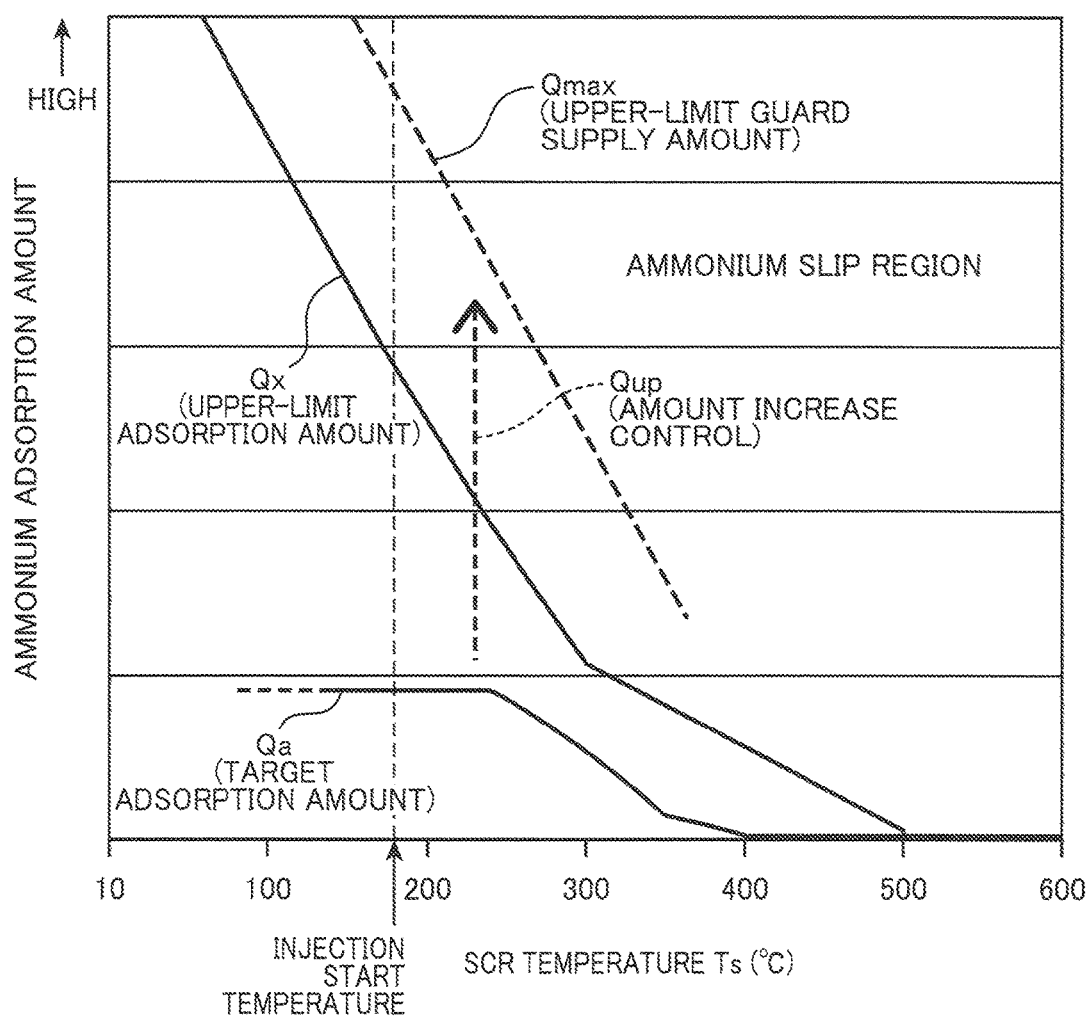
FIG. 7 is a graph where a relationship between an amount increase control and an upper-limit guard amount of urea water is added to the graph in FIG. 5.

FIG. 7 is a graph obtained by adding matters relating to an amount increase control Qup of urea water to the graph in FIG. 5. In the amount increase control Qup, an upper-limit guard supply amount Qmax is referenced. The upper-limit guard supply amount Qmax is larger than a supply amount of urea water necessary for achieving the target adsorption amount Qa and is a line indicating a true supply limit of urea water in a region where a supply amount of urea water exceeds the upper-limit adsorption amount Qx. That is, although the upper-limit guard supply amount Qmax is the supply amount of urea water which falls within an ammonium slip region, the upper-limit guard supply amount Qmax is a limit line where ammonium slipped from the SCR catalyst 43 can be processed by the slip catalyst 44.

As described above, in the normal dosing control, a supply amount of urea water supplied from the pump 46P to the urea injector 45 is controlled so as to follow the target adsorption amount Qa corresponding to a temperature Ts of the SCR catalyst 43. In the amount increase control Qup, the UI protection controller 105 supplies urea water which exceeds the target adsorption amount Qa to the urea injector 45. With such an operation, urea water functions as a cooling medium thus cooling the urea injector 45. However, when urea water is supplied to an extent that a supply amount of urea water exceeds the upper-limit guard supply amount Qmax, ammonium which cannot be processed by the slip catalyst 44 is discharged from a vehicle. In this case, ammonia odor spreads to the outside of the vehicle. Accordingly, it is desirable to increase an amount of urea water within a range where an amount of urea water does not exceed the upper-limit guard supply amount Qmax.

A urea water recovery control is performed in the case where even when the amount increase control Qup is performed, an internal temperature of the urea injector 45 does not fall below a predetermined high temperature and an amount of ammonium adsorbed by the SCR catalyst 43 is larger than a predetermined reference adsorption amount. That is, the UI protection controller 105 performs the above-mentioned recovery control in the case where an amount of ammonium which causes no trouble in current NOx reduction processing is adsorbed by the SCR catalyst 43. Specifically, the UI protection controller 105 stops the supply of urea water to the urea injector 45 and, at the same time, controls an operation of the pump 46P such that urea water remaining in the urea injector 45 is recovered to the urea tank 46.

To the contrary, in a state where an ammonia adsorption amount of the SCR catalyst 43 is less than a predetermined reference adsorption amount, the above-mentioned recovery control is not performed. That is, the UI protection controller 105 does not perform the recovery control in a situation where a trouble may occur in the NOx reduction processing. That is, in the case where an internal temperature of the urea injector 45 reaches a predetermined high temperature, instead of unconditionally recovering urea water from the urea injector 45, when the NOx purification ability of the SCR catalyst 43 is insufficient, urea water is not recovered. In this case, the amount increase control Qup is continued.

Figure 8:
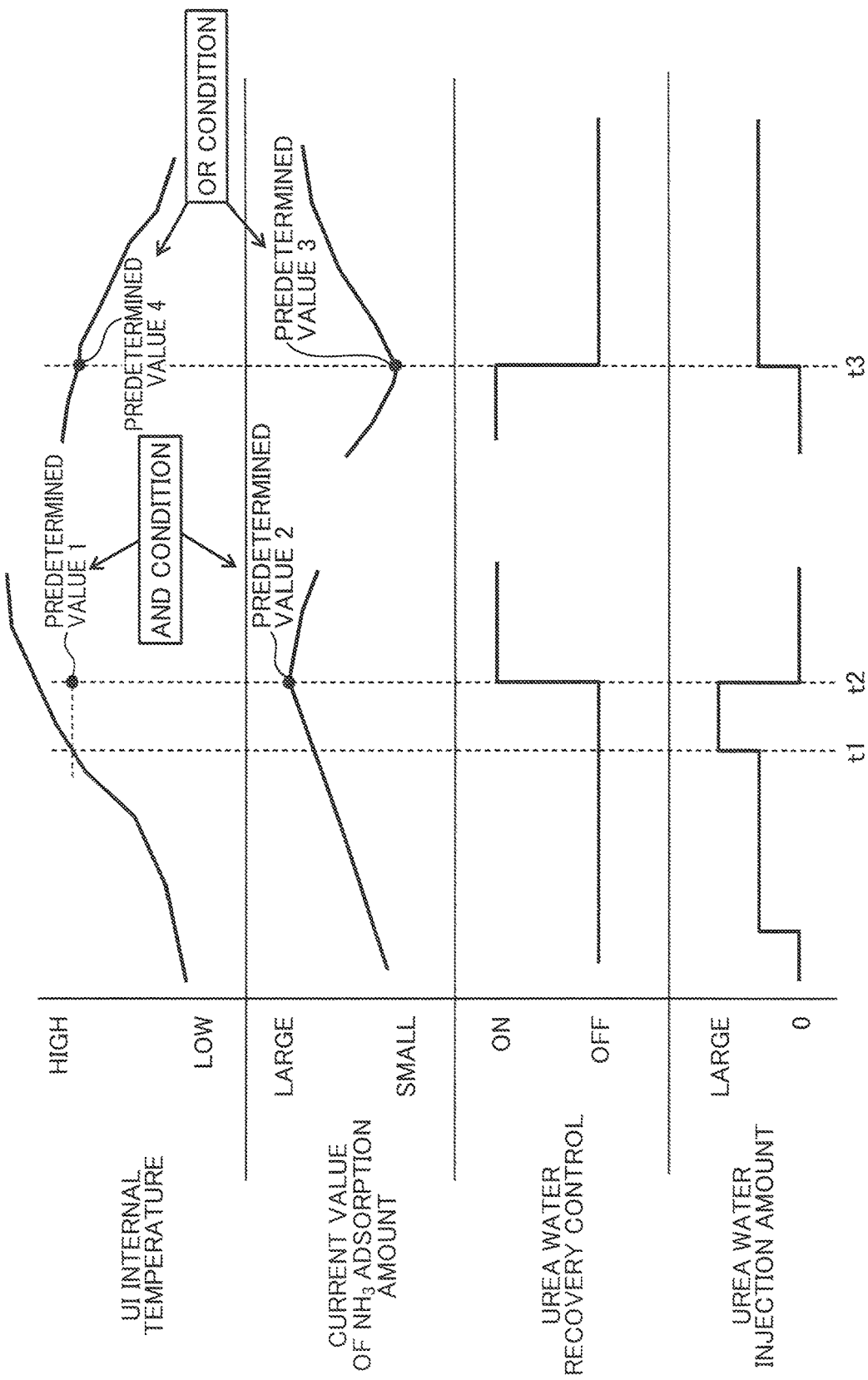
FIG. 8 is a timing chart showing one example of a control for protecting a urea injector.

FIG. 8 is a timing chart illustrating the concept of the above-mentioned control for protecting the urea injector 45. Phenomena monitored in the protection control are an internal temperature of the urea injector 45 (UI internal temperature) and an amount of ammonium currently adsorbed by the SCR catalyst 43 (a current value of an $NH_3$ adsorption amount). An estimation value which is derived by the UI temperature estimation part 104 is referenced as the UI internal temperature, and an ammonium adsorption amount (a current ammonium adsorption amount Qc in FIG. 6) obtained by the SCR state estimation part 102 is referenced as the current value of an $NH_3$ adsorption amount.

When the UI internal temperature exceeds "predetermined value 1" at timing t1, an injection amount of urea water is increased. This is indicated as the amount increase control Qup of urea water in FIG. 7. Although the "predetermined value 1" can be set to an arbitrary temperature, it is desirable that the predetermined value 1 be set to a temperature immediately before urea water boils under a pressure in the urea injector 45. Accordingly, urea water can be increased and can be recovered from the urea injector 45 before urea water actually boils in the urea injector 45. Accordingly, it is possible to reliably prevent the urea injector 45 from being damaged. At a point of time of timing t1, the urea water recovery control is not yet performed.

When a current value of an $NH_3$ adsorption amount exceeds "predetermined value 2" at timing t2 which follows the timing t1, a urea water recovery control is performed. That is, when an AND condition where a UI internal temperature exceeds the "predetermined value 1" and a current value of an $NH_3$ adsorption amount exceeds the "predetermined value 2" is established, a urea water recovery control is started. On the other hand, at this timing t2, the injection of urea water from the urea injector 45 is stopped. In this example, a period from the timing t1 to the timing t2 becomes a period during which a urea water amount increase control Qup is performed. As a matter of course, when the current value of an $NH_3$ adsorption amount exceeds the "predetermined value 2" at the timing t1, the above-mentioned recovery control is started at the timing t1.

The "predetermined value 2" can be set to a value larger than a reference adsorption amount determined based on an amount of adsorbable ammonium in the SCR catalyst 43 by a predetermined amount. Preferably, the target adsorption amount Qa shown in FIG. 5 and FIG. 7 can be used as the reference adsorption amount. In this case, the "predetermined value 2" can be set to a value larger than the target adsorption amount Qa, that is, a value between the target adsorption amount Qa and the upper-limit adsorption amount Qx or an arbitrary value between the target adsorption amount Qa and the upper-limit guard supply amount Qmax.

When a current value of an $NH_3$ adsorption amount becomes less than a "predetermined value 3" at a timing t3 which follows the timing t2, the urea water recovery control is stopped, and the injection of urea water from the urea injector 45 is restarted. This is because when the injection of urea water is stopped at the timing t2 and ammonium adsorbed by the SCR catalyst 43 is gradually consumed so that an adsorbed ammonium amount becomes less than a predetermined amount, the NOx purification performance of the SCR catalyst 43 is lowered. The target adsorption amount Qa can be used as the "predetermined value 3", for example. By restarting the injection of urea water, an adsorbed ammonium amount of the SCR catalyst 43 can be recovered. During a predetermined period from the timing t3, an amount of urea water larger than the amount of urea water in a normal state may be injected from the urea injector 45.

Alternatively, when the UI internal temperature becomes less than a "predetermined value 4" at the timing t3, the urea water recovery control is stopped, and injection of urea water from the urea injector 45 is restarted. This is because when the UI internal temperature escapes from a predetermined high temperature state, boiling of urea water occurs no more and hence, it is meaningless to perform the urea water recovery control anymore. The "predetermined value 4" may be set to the same temperature as the "predetermined value 1" or may be set to a value slightly lower than the "predetermined value 1" or a temperature slightly higher than the "predetermined value 1". That is, when the OR condition where the current value of an $NH_3$ adsorption amount is less than the "predetermined value 3" or the UI internal temperature is less than the "predetermined value 4" is established, the urea water recovery control is finished.

[Control Flow by Controller]

Figure 9:
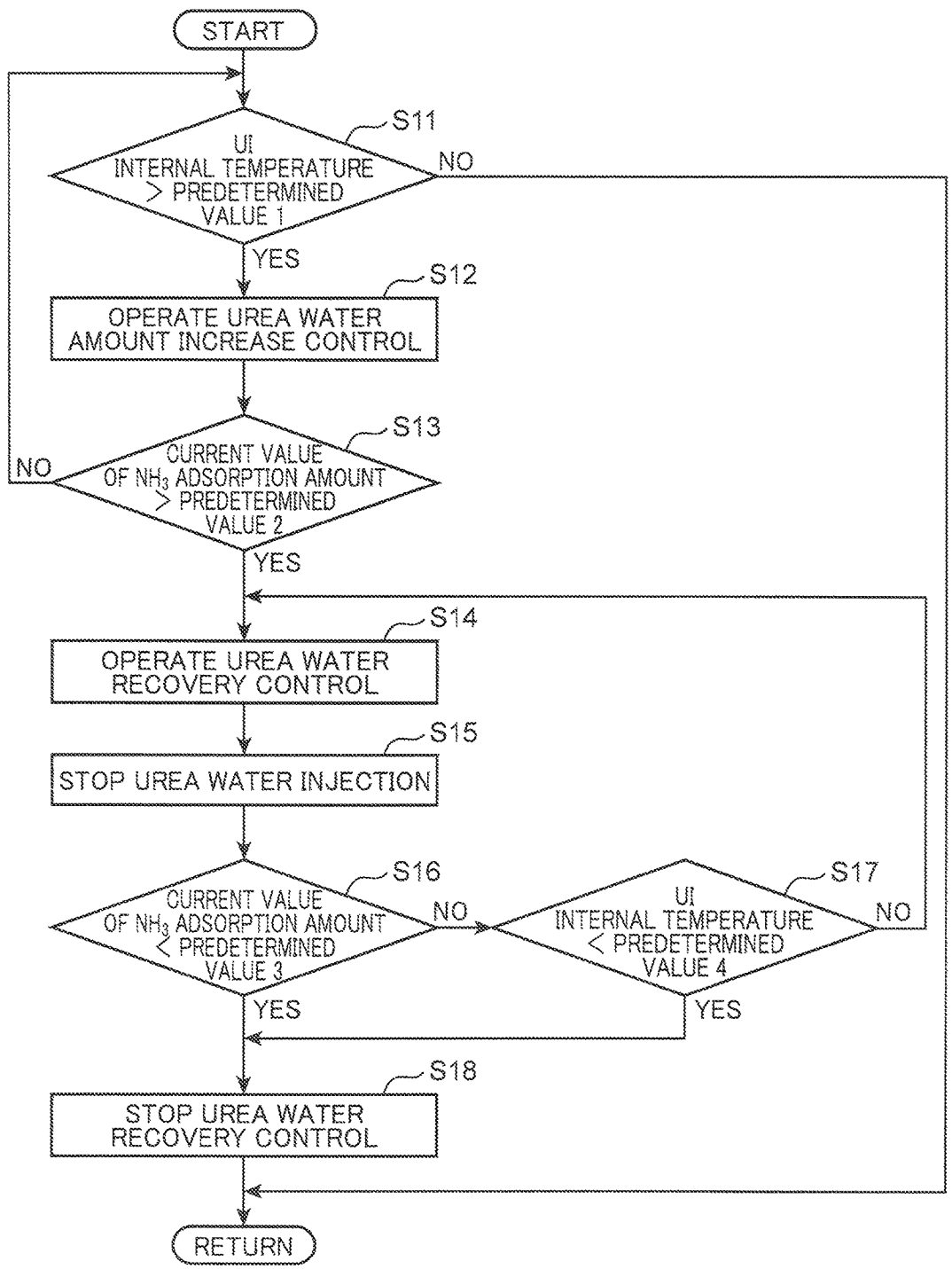
FIG. 9 is a flowchart showing one example of a control for protecting the urea injector.

FIG. 9 is a flowchart showing a specific example of a protection control by the controller 100. Under a situation where the dosing control shown in FIG. 3 is performed by the dosing controller 103 of the controller 100, the UI temperature estimation part 104 monitors whether or not an internal temperature of the urea injector 45 (UI internal temperature) exceeds the previously-mentioned "predetermined value 1" at a predetermined sampling cycle (step S11). When the UI internal temperature is less than the "predetermined value 1" (NO in step S11), the UI protection controller 105 does not perform the protection control, and a dosing control shown in FIG. 3 is continued.

To the contrary, when the UI internal temperature exceeds the "predetermined value 1" (YES in step S11), the UI protection controller 105 performs a urea water amount increase control as a first step of the protection control (step S12). Specifically, the UI protection controller 105 increases an amount of urea water supplied from the pump 46P to the urea injector 45 by a predetermined amount. Due to the increase of urea water, performance for cooling the urea injector 45 is enhanced and, at the same time, an amount of ammonium adsorbed by the SCR catalyst 43 can be increased so that the NOx purification ability of the SCR catalyst at this point of time can be enhanced.

Next, the UI protection controller 105 determines whether or not an amount of ammonium adsorbed by the SCR catalyst 43 at the current time (a current value of an $NH_3$ adsorption amount) exceeds the previously-mentioned "predetermined value 2" based on an ammonium adsorption amount obtained by the SCR state estimation part 102 (step S13). When the current value of an $NH_3$ adsorption amount does not exceed the "predetermined value 2" (NO in step S13), the SCR catalyst 43 is in a state where an amount of ammonium which causes no trouble in the current NOx reduction processing even when the injection of urea water is stopped is not adsorbed by the SCR catalyst 43. Accordingly, the processing returns to step S11, and the urea water amount increase control (step S12) is continued as long as the UI internal temperature exceeds the "predetermined value 1".

On the other hand, a state is brought about where the current value of an $NH_3$ adsorption amount exceeds the "predetermined value 2" (YES in step S13, at the timing t2 shown in FIG. 8), the UI protection controller 105 performs a urea water recovery control as a second step of the protection control (step S14). Specifically, the UI protection controller 105 stops the operation of the supply of urea water from the pump 46P to the urea injector 45. With such an operation, the injection of urea water is stopped (step S15). Then, although depending on a kind of a pump, the UI protection controller 105 makes the pump 46P generate a negative pressure when necessary thus enabling the recovery of urea water remaining in the urea injector 45 and the supply pipe 46a to the urea tank 46.

Subsequently, the UI protection controller 105 determines whether or not a state is brought about where a current value of an $NH_3$ adsorption amount is less than the previously-mentioned "predetermined value 3" (step S16). When the current value of an $NH_3$ adsorption amount exceeds the "predetermined value 3" (NO in step S16), the SCR catalyst 43 is still in a state where the SCR catalyst 43 possesses the NOx purification ability and hence, the urea water recovery control is not stopped immediately. On the other hand, when the current value of an $NH_3$ adsorption amount is less than the "predetermined value 3" (YES in step S16, at the timing t3 shown in FIG. 8), the UI protection controller 105 stops the urea water recovery control (step S18). With such an operation, the processing returns to a state where the dosing control shown in FIG. 3 is performed.

When the current value of an $NH_3$ adsorption amount exceeds the "predetermined value 3" (NO in step S16), the UI protection controller 105 also determines whether or not the UI internal temperature is less than the previously-mentioned "predetermined value 4" (step S17). When the UI internal temperature exceeds the "predetermined value 4" (NO in step S17), a state is brought about where urea water may boil and hence, processing returns to step S14, and the UI protection controller 105 continues the urea water recovery control. On the other hand, when the UI internal temperature is less than the "predetermined value 4" (YES in step S17, at the timing t3 in FIG. 8), the UI protection controller 105 stops the urea water recovery control (step S18).

[Operation and Effects]

According to the exhaust system 4S (exhaust purification device) of an engine of this embodiment described above, the following operation and effects can be acquired. The controller 100 of this embodiment does not unconditionally perform the recovery operation for recovering urea water from the urea injector 45 when an internal temperature of the urea injector 45 reaches a predetermined high temperature. Instead, the controller 100 performs the recovery operation when two conditions are established, that is, when the condition where the urea injector 45 becomes a high temperature (a UI internal temperature exceeds the "predetermined value 1"), and the condition where an amount of ammonium adsorbed by the SCR catalyst 43 is larger than a predetermined reference adsorption amount (a current value of an $NH_3$ adsorption amount exceeds the "predetermined value 2") are established. In other words, even under the condition where the urea injector 45 becomes a high temperature, the recovery operation of urea water is not performed unless an amount of ammonium is larger than the reference adsorption amount.

That is, when an amount of ammonium is larger than the reference adsorption amount, the SCR catalyst 43 is in a state where the SCR catalyst 43 possesses sufficient NOx purification performance and hence, it is unnecessary to supply urea water immediately. In this case, urea water is recovered from the urea injector 45 thus preventing boiling of urea water caused by the increase of a temperature of the urea injector 45 to a high temperature. On the other hand, when an amount of ammonium is not larger than the reference adsorption amount, the SCR catalyst 43 is in a state where a margin of the NOx purification ability of the SCR catalyst 43 is insufficient. In this case, urea water is not recovered from the urea injector 45, and a state where urea water can be immediately supplied into the exhaust passage 40 is maintained. By performing such a control by the controller 100, it is possible to suppress occurrence of a damage on the urea injector 45 caused by boiling of urea water without lowering the NOx purification performance.

The controller 100 also performs a control such that an amount of ammonium adsorbed by the SCR catalyst 43 is maintained at a target adsorption amount Qa (FIG. 5, FIG. 7). The target adsorption amount Qa is smaller than an upper-limit adsorption amount Qx of ammonium in the SCR catalyst 43, and is a proper amount for performing desired NOx purification and hence, the proper NOx purification can be performed while suppressing slippage of ammonium in the SCR catalyst 43. Further, the controller 100 (UI protection controller 105) uses the target adsorption amount Qa as the reference adsorption amount, and performs the above-mentioned urea water recovery operation when an amount of ammonium larger than the target adsorption amount Qa is adsorbed by the SCR catalyst 43. In this manner, the controller 100 uses a state whether or not an amount of ammonium adsorbed by the SCR catalyst 43 is larger than the target adsorption amount Qa as an index for determining whether or not a urea water recovery operation is to be performed. Accordingly, it is possible to further enhance the NOx purification performance of the exhaust system 4S. That is, it is possible to suppress the lowering of the NOx purification performance.

In the case where the SCR catalyst 43 is not brought into a state where an ammonium adsorption amount is larger than a target adsorption amount Qa under a condition where a temperature of the urea injector 45 reaches a predetermined high temperature, the controller 100 performs an amount increase control for increasing a supply amount of urea water from the urea tank 46 to the urea injector 45. Due to an increased amount of urea water, performance for cooling the urea injector 45 can be enhanced. Further, due to the increase of an amount of urea water, an amount of ammo-nium adsorbed by the SCR catalyst 43 can be increased thus enhancing the NOx purification ability of the SCR catalyst 43.

Further, the controller 100 uses a state where a vehicle speed of a vehicle is a low speed equal to or below a predetermined speed as a condition for determining that an internal temperature of the urea injector 45 reaches a predetermined high temperature. When a vehicle speed is a low speed, an effect for cooling the urea injector 45 by traveling air is lowered and hence, it is possible to estimate that an internal temperature of the urea injector 45 becomes a high temperature based on a fact that the vehicle speed is a low speed. Accordingly, even when an internal temperature of the urea injector 45 cannot be directly measured, it is possible to properly determine that the urea injector 45 becomes a high temperature based on a vehicle speed.

[Modifications]

Although the embodiment of the present invention has been described above, the present invention is not limited to the above-mentioned embodiment, and the following modifications are also conceivable.

(1) In the above-mentioned embodiment, the description has been made with respect to the case where the amount increase control and the control for recovering urea water are performed as the control for protecting the urea injector 45. That is, the description has been made with respect to the case where, first, attempt is made to perform a control for increasing an amount of urea water, and in the case where cooling of the urea injector 45 does not progress even when the amount increase control is performed and a condition where a current value of an $NH_3$ adsorption amount is larger than a reference adsorption amount is established, a urea water recovery control is performed. In place of such a control, a control of increasing an amount of urea water may be omitted, and a urea water recovery control may be performed when an internal temperature of the urea injector 45 simply becomes a predetermined high temperature and a current value of an $NH_3$ adsorption amount is larger than a reference adsorption amount.

(2) In the above-mentioned embodiment, the description has been made with respect to the case where the exhaust purification device according to the present invention is applied to the diesel engine which ignites fuel containing light oil as a main component by compression. However, it is sufficient that an engine to which the present invention is applicable be an engine which requires the provision of an SCR catalyst for purifying NOx. For example, the present invention may be applied to a lean burn gasoline engine where fuel containing, for example, gasoline as a main component is burnt based on a lean air/fuel ratio.

In the above-mentioned specific embodiment, an engine with a turbosupercharger having the following configuration is disclosed.

An exhaust purification device of an engine according to an aspect of the present invention includes: an exhaust passage through which an exhaust gas discharged from an engine body flows; a urea injector which supplies urea water into the exhaust passage; a pump device which supplies urea water stored in a urea tank to the urea injector, the pump device capable of performing an operation of recovering the urea water supplied to the urea injector to the urea tank; an SCR catalyst which is disposed in the exhaust passage downstream of the urea injector and purifies NOx in the exhaust gas by a reduction action of ammonium produced from urea; and a controller which controls an operation of the urea injector and an operation of the pump device. In such an exhaust purification device, the controller is configured to control the pump device such that the supply of the urea water to the urea injector is stopped, and a recovery operation for recovering the urea water in the urea injector to the urea tank is performed in a case where an amount of ammonium adsorbed by the SCR catalyst is larger than a predetermined reference adsorption amount under a condition where an internal temperature of the urea injector reaches a predetermined high temperature.

An exhaust purification method according to another aspect of the present invention is an exhaust purification method using an exhaust purification device of an engine which includes: an exhaust passage through which an exhaust gas discharged from an engine body flows; a urea injector which supplies urea water into the exhaust passage; a pump device which supplies urea water stored in a urea tank to the urea injector, the pump device capable of performing an operation of recovering the urea water supplied to the urea injector to the urea tank; and an SCR catalyst which is disposed in the exhaust passage downstream of the urea injector, and purifies NOx in an exhaust gas by a reduction action of ammonium produced from urea. The method includes the steps of: determining whether or not an amount of ammonium adsorbed by the SCR catalyst is larger than a predetermined reference adsorption amount under a condition where an internal temperature of the urea injector reaches a predetermined high temperature; and causing the pump device to stop the supply of the urea water to the urea injector and perform a recovery operation for recovering the urea water in the urea injector to the urea tank in a case where the amount of ammonium is larger than the reference adsorption amount.

According to the exhaust purification device or the exhaust purification method, the operation for recovering urea water is not performed unconditionally when an internal temperature of the urea injector reaches a predetermined high temperature, and the operation for recovering urea water is performed when two conditions are established, that is, when a condition where the urea injector becomes a high temperature and a condition where an amount of ammonium adsorbed by the SCR catalyst is larger than a predetermined reference adsorption amount are established. In other words, even under a condition where the urea injector becomes a high temperature, provided that an amount of ammonium is not larger than the reference adsorption amount, the operation for recovering urea water is not performed.

That is, when the amount of ammonium is larger than the reference adsorption amount, the SCR catalyst is in a state where the SCR catalyst possesses the sufficient NOx purification performance and hence, it is unnecessary to supply urea water immediately. In this case, urea water is recovered from the urea injector thus preventing boiling of urea water caused by the increase of a temperature of the urea injector to a high temperature. On the other hand, when the amount of ammonium is not larger than the reference adsorption amount, the SCR catalyst is in a state where a margin of the NOx purification ability of the SCR catalyst is insufficient. In this case, urea water is not recovered from the urea injector, and a state where urea water can be immediately supplied into the exhaust passage is maintained. Such a control is performed by the controller and hence, it is possible to suppress occurrence of a damage on the urea injector caused by boiling of urea water without lowering the NOx purification performance.

In the above-mentioned exhaust purification device, it is desirable that the predetermined high temperature be a temperature immediately before the urea water in the urea injector is boiled.

According to the exhaust purification device having such a configuration, urea water can be recovered from the urea injector before the urea water boils in the urea injector. Accordingly, it is possible to reliably suppress occurrence of a damage on the urea injector.

In the above-mentioned exhaust purification device, it is desirable that the reference adsorption amount be a target adsorption amount preset based on an amount of ammonium adsorbable by the SCR catalyst, and the controller be configured to control an operation of the urea injector and an operation of the pump device such that the amount of ammonium adsorbed by the SCR catalyst becomes the target adsorption amount, and the controller be configured to perform the recovery operation in a case where an amount of ammonium adsorbed by the SCR catalyst is larger than the target adsorption amount under a condition where a temperature of the urea injector reaches a predetermined high temperature.

According to the exhaust purification device having such a configuration, the controller performs a control such that an amount of ammonium adsorbed by the SCR catalyst is maintained at the target adsorption amount. For example, by setting the target adsorption amount to an amount less than an upper-limit adsorption amount (saturated adsorption amount) of ammonium adsorbed by the SCR catalyst and to a proper amount for performing desired NOx purification, the proper NOx purification can be performed while suppressing slippage of ammonium in the SCR catalyst. Further, by using the target adsorption amount as the reference adsorption amount, and by using the target adsorption amount as an index for determining whether or not the above-mentioned urea water recovery operation is performed, the NOx purification performance of the exhaust purification device can be further enhanced.

In the above-mentioned exhaust purification device, it is preferable that the target adsorption amount be a variable value in which the amount of ammonium adsorbed by the SCR catalyst becomes smaller as a temperature of the SCR catalyst is higher, and the controller be configured to control the operation of the urea injector and the operation of the pump device corresponding to the variable target adsorption amount.

According to the exhaust purification device having such a configuration, the above-mentioned urea water recovery operation can be performed in a state where a proper amount of ammonium is adsorbed by the SCR catalyst in conformity with the property of the SCR catalyst where an upper-limit adsorption amount of ammonium is changed in response to a temperature.

In the above-mentioned exhaust purification device, it is desirable that the controller be configured to perform a control of increasing a supply amount of the urea water to the urea injector in a case where the amount of ammonium adsorbed by the SCR catalyst is not yet larger than the reference adsorption amount under a condition where a temperature of the urea injector reaches the predetermined high temperature.

According to the exhaust purification device having such a configuration, the performance for cooling the urea injector can be enhanced by increased urea water. As a matter of course, due to the increase of urea water, an amount of ammonium adsorbed by the SCR catalyst can be increased thus enhancing the NOx purification ability of the SCR catalyst.

In the above-mentioned exhaust purification device, it is desirable that the engine be a vehicle-mounted engine which is mounted on a vehicle, and the controller use a state where a vehicle speed of the vehicle is a low speed equal to or below a predetermined speed as a condition for determining that an internal temperature of the urea injector reaches a predetermined high temperature.

When a vehicle speed is a low speed, an effect of cooling the urea injector by traveling air is lowered. Accordingly, it is possible to estimate that an internal temperature of the urea injector is increased to a high temperature based on a fact that the vehicle is in a low speed driving state. Accordingly, even when an internal temperature of the urea injector cannot be directly measured, it is possible to properly determine the increase of the internal temperature of the urea injector to a high temperature based on a vehicle speed.

In the above-mentioned exhaust purification device, it is preferable that the controller be configured to obtain an amount of ammonium adsorbed by the SCR catalyst by performing: a first arithmetic operation for obtaining an ammonium supply amount obtained based on an injection history of urea water injected from the urea injector and an ammonium consumption amount consumed by the SCR catalyst; a second arithmetic operation for calculating an amount ammonium accumulated in the SCR catalyst by subtracting the ammonium consumption amount from the ammonium supply amount; and a third arithmetic operation for calculating an amount of ammonium adsorbed by the SCR catalyst by integrating amounts of ammonium accumulated at respective point of times.

According to the exhaust purification device, an amount of ammonium currently adsorbed by the SCR catalyst can be accurately grasped at respective points of time by the first to third arithmetic operations without using a sensing element.

An exhaust purification device of an engine according to another aspect of the present invention includes: an exhaust passage through which an exhaust gas discharged from an engine body flows; a urea injector which supplies urea water into the exhaust passage; a urea tank for storing the urea water; a supply pipe connecting the urea injector and the urea tank to each other; a pressurizing pump incorporated in the supply pipe, the pressurizing pump capable of supplying the urea water stored in the urea tank to the urea injector by generating a predetermined pressurizing force, and capable of performing an operation of recovering the urea water supplied to the urea injector to the urea tank when the pressurizing force is stopped; an SCR catalyst which is disposed in the exhaust passage downstream of the urea injector and purifies NOx in the exhaust gas by a reduction action of ammonium generated from urea; and a controller for controlling an operation of the urea injector and an operation of the pump device. The controller is configured to control the pressurizing pump such that the supply of the urea water to the urea injector is stopped, and a recovery operation for recovering the urea water in the urea injector to the urea tank is performed in a case where an amount of ammonium adsorbed by the SCR catalyst is larger than the target adsorption amount which is set such that the amount of ammonium adsorbed by the SCR catalyst becomes smaller as a temperature of the SCR catalyst is higher under a condition where an internal temperature of the urea injector reaches a temperature immediately before the urea water is boiled.

According to the present invention, it is possible to provide an exhaust purification device of an engine which can suppress occurrence of a damage on a urea injector without lowering a NOx purifying performance.

This application is based on Japanese Patent application No. 2017-182511 filed in Japan Patent Office on Sep. 22, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An exhaust purification device of an engine comprising:
    an exhaust passage through which an exhaust gas discharged from an engine body flows;
    a urea injector which supplies urea water into the exhaust passage;
    a pump device which supplies urea water stored in a urea tank to the urea injector,
    the pump device capable of performing a recovery operation of recovering the urea water supplied to the urea injector to the urea tank;
    an SCR catalyst which is disposed in the exhaust passage downstream of the urea injector and purifies NOx in the exhaust gas by a reduction action of ammonium produced from urea; and
    a controller which controls an operation of the urea injector and an operation of the pump device, wherein
    the controller is configured to control the pump device such that the supply of the urea water to the urea injector is stopped, and the controller is configured to control the pump device to perform the recovery operation for recovering the urea water supplied to the urea injector to the urea tank in a case where an amount of ammonium adsorbed by the SCR catalyst is larger than a predetermined reference adsorption amount under a condition where an internal temperature of the urea injector reaches a predetermined high temperature, and
    the predetermined reference adsorption amount is a target adsorption amount preset based on an amount of ammonium adsorbable by the SCR catalyst, and the controller is configured to control the operation of the urea injector and the operation of the pump device such that the amount of ammonium adsorbed by the SCR catalyst becomes the target adsorption amount.

2. The exhaust purification device of an engine according to claim 1, wherein the predetermined high temperature is a temperature immediately before the urea water in the urea injector is boiled.

3. The exhaust purification device of an engine according to claim 1, wherein
    the target adsorption amount is a variable value in which the amount of ammonium adsorbed by the SCR catalyst becomes smaller as a temperature of the SCR catalyst is higher, and
    the controller is configured to control the operation of the urea injector and the operation of the pump device corresponding to the variable target adsorption amount.

4. The exhaust purification device of an engine according to claim 1, wherein
    the controller is configured to perform a control of increasing a supply amount of the urea water to the urea injector in a case where the amount of ammonium adsorbed by the SCR catalyst is not yet larger than the predetermined reference adsorption amount under the condition where the internal temperature of the urea injector reaches the predetermined high temperature.

5. The exhaust purification device of an engine according to claim 1, wherein
the engine is a vehicle-mounted engine which is mounted on a vehicle, and
the controller uses a state where a vehicle speed of the vehicle is a low speed equal to or below a predetermined speed as a condition for determining that the internal temperature of the urea injector reaches the predetermined high temperature.

6. The exhaust purification device of an engine according to claim 1, wherein
the controller is configured to obtain an amount of ammonium adsorbed by the SCR catalyst by performing:
a first arithmetic operation for obtaining an ammonium supply amount obtained based on an injection history of urea water injected from the urea injector and an ammonium consumption amount consumed by the SCR catalyst;
a second arithmetic operation for calculating an amount of ammonium accumulated in the SCR catalyst by subtracting the ammonium consumption amount from the ammonium supply amount; and
a third arithmetic operation for calculating the amount of ammonium adsorbed by the SCR catalyst by integrating amounts of ammonium accumulated at respective point of times.

7. An exhaust purification device of an engine comprising:
an exhaust passage through which an exhaust gas discharged from an engine body flows;
a urea injector which supplies urea water into the exhaust passage;
a urea tank for storing the urea water;
a supply pipe connecting the urea injector and the urea tank to each other;
a pressurizing pump incorporated in the supply pipe, the pressurizing pump capable of supplying the urea water stored in the urea tank to the urea injector by generating a predetermined pressurizing force, and capable of performing a recovery operation of recovering the urea water supplied to the urea injector to the urea tank when the pressurizing force is stopped;
an SCR catalyst which is disposed in the exhaust passage downstream of the urea injector and purifies NOx in the exhaust gas by a reduction action of ammonium generated from urea; and
a controller for controlling an operation of the urea injector and an operation of the pressurizing pump, wherein
the controller is configured to control the pressurizing pump such that the supply of the urea water to the urea injector is stopped, and the controller is configured to control the pressurizing pump to perform the recovery operation for recovering the urea water supplied to the urea injector to the urea tank in a case where an amount of ammonium adsorbed by the SCR catalyst is larger than a target adsorption amount, which is set such that the amount of ammonium adsorbed by the SCR catalyst becomes smaller as a temperature of the SCR catalyst is higher, under a condition where an internal temperature of the urea injector reaches a predetermined high temperature immediately before the urea water is boiled, and
the target adsorption amount is preset based on an amount of ammonium adsorbable by the SCR catalyst, and the controller is configured to control the operation of the urea injector and the operation of the pressurizing pump such that the amount of ammonium adsorbed by the SCR catalyst becomes the target adsorption amount.

8. An exhaust purification method using an exhaust purification device of an engine which includes:
an exhaust passage through which an exhaust gas discharged from an engine body flows;
a urea injector which supplies urea water into the exhaust passage;
a pump device which supplies urea water stored in a urea tank to the urea injector, the pump device capable of performing a recovery operation of recovering the urea water supplied to the urea injector to the urea tank; and
an SCR catalyst which is disposed in the exhaust passage downstream of the urea injector and purifies NOx in the exhaust gas by a reduction action of ammonium produced from urea, the method comprising the steps of:
determining whether or not an amount of ammonium adsorbed by the SCR catalyst is larger than a predetermined reference adsorption amount under a condition where an internal temperature of the urea injector reaches a predetermined high temperature, wherein the predetermined reference adsorption amount is a target adsorption amount preset based on an amount of ammonium adsorbable by the SCR catalyst;
causing the pump device to stop the supply of the urea water to the urea injector and perform the recovery operation for recovering the urea water supplied to the urea injector to the urea tank in a case where the amount of ammonium adsorbed by the SCR catalyst is larger than the target adsorption amount under the condition where the internal temperature of the urea injector reaches the predetermined high temperature; and
controlling an operation of the urea injector and an operation of the pump device such that the amount of ammonium adsorbed by the SCR catalyst becomes the target adsorption amount.

* * * * *